United States Patent
Eagan et al.

(10) Patent No.: US 12,173,116 B2
(45) Date of Patent: Dec. 24, 2024

(54) DEGRADABLE POLYMER STRUCTURES FROM CARBON DIOXIDE AND OLEFIN AND CORRESPONDING METHOD

(71) Applicants: James M. Eagan, Akron, OH (US); Luis D. Garcia Espinosa, Streetsboro, OH (US)

(72) Inventors: James M. Eagan, Akron, OH (US); Luis D. Garcia Espinosa, Streetsboro, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 152 days.

(21) Appl. No.: 17/469,100

(22) Filed: Sep. 8, 2021

(65) Prior Publication Data

US 2022/0073675 A1 Mar. 10, 2022

Related U.S. Application Data (60) Provisional application No. 63/225,160, filed on Jul. 23, 2021, provisional application No. 63/075,429, filed on Sep. 8, 2020.

(51) Int. Cl.
*C08G 63/08* (2006.01)
*C08G 63/82* (2006.01)
*C08G 63/87* (2006.01)

(52) U.S. Cl.
CPC ........... *C08G 63/08* (2013.01); *C08G 63/823* (2013.01); *C08G 63/87* (2013.01)

(58) Field of Classification Search
CPC ....... C08G 63/08; C08G 63/823; C08G 63/87
See application file for complete search history.

(56) References Cited

U.S. PATENT DOCUMENTS

| | | | | |
|---|---|---|---|---|
| 4,393,224 A | * | 7/1983 | Daniels | C07D 315/00 560/208 |
| 9,796,812 B2 | | 10/2017 | Hosokawa et al. | |
| 2014/0194648 A1 | * | 7/2014 | Boeing | B01J 35/1019 560/231 |
| 2016/0090442 A1 | * | 3/2016 | Hosokawa | C08G 63/08 524/599 |
| 2024/0182633 A1 | * | 6/2024 | Tonks | C08G 63/87 |

FOREIGN PATENT DOCUMENTS

| | | | |
|---|---|---|---|
| CN | 112876665 | * | 6/2021 |
| DE | 0960897 | * | 12/1999 |
| WO | 2017202644 | | 11/2017 |

OTHER PUBLICATIONS

Moon et al "Reversible Polymer-Chain Modification: Ring-Opening and Closing of Polylactone", J. Am. Chem. Soc. 2019, 141, 10938-10942 (Year: 2019).*
Pratt et al "Triazabicyclodecene: A Simple Bifunctional Organocatalyst for Acyl Transfer and Ring-Opening Polymerization of Cyclic Esters", J. Am. Chem. Soc. 2006, 128, 4556-4557 (Year: 2006).*
Liu et al "Highly Efficient Synthesis of Functionalizable Polymers from a CO2/1,3-Butadiene-Derived Lactone", ACS Macro Lett. 2017, 6, 1373-1378 (Year: 2017).*
Chang et al "Ion pairing effects in the zwitterionic ring opening polymerization of δ-valerolactone", Polym. Chem., 2015, 6, 5212-5218. (Year: 2015).*
Ito et al " Ring-Chain Equilibrium in the Anionic Polymerization of delta-Valerolactone", Polymer Bulletin 1, 569-573 (1979) (Year: 1979).*
Luis D. Garcia Espinosa et al "Degradable Polymer Structures from Carbon Dioxide and Butadiene", ACS Macro Lett. 2021, 10, 1254-1259 (Year: 2021).*
Luis Simon et al "The Mechanism of TBD-Catalyzed Ring-Opening Polymerization of Cyclic Esters", J. Org. Chem. 2007, 72, 9656-9662 (Year: 2007).*
Yue et al; Ring-Opening Polymerization of CO2-Based Disubstituted o-Valerolactone toward Sustainable Functional Polyesters; ACS Macro Lett. 2021, 10, 1055-1060; Published: Jul. 29, 2021.
Duparc et al.; Ring-opening (co)polymerization of six-membered substituted δ-valerolactones with alkali metal alkoxides; European Polymer Journal 134 (2020) 109858; Available online Jun. 26, 2020.
Nakano et al.; Copolymerization of carbon dioxide and butadiene via a lactone intermediate; Nature Chemistry; vol. 6; Apr. 2014.

* cited by examiner

*Primary Examiner* — Frances Tischler
*Assistant Examiner* — Gennadiy Mesh
(74) *Attorney, Agent, or Firm* — RENNER KENNER GREIVE BOBAK TAYLOR & WEBER (57) ABSTRACT

A method of producing a degradable material comprising steps of hydrogenating 2-ethylidene-6-hepten-5-olide (EVL) by introducing hydrogen to the EVL in order to obtain modified EVL; combining the modified EVL with a catalyst to form a reaction mixture; and subjecting the reaction mixture to reaction conditions that will allow the modified EVL to react by ring-opening polymerization in the presence of the catalyst to form a product composition including polymeric-EVL, wherein the polymeric-EVL is hydrolytically degradable, wherein the reaction conditions include a reaction temperature of from −40° C. to 70° C.

10 Claims, 6 Drawing Sheets

DEGRADABLE POLYMER STRUCTURES FROM CARBON DIOXIDE AND OLEFIN AND CORRESPONDING METHOD

CROSS-REFERENCE TO RELATED APPLICATIONS

This application claims the benefit of U.S. Provisional Application No. 63/075,429, filed on Sep. 8, 2020, and U.S. Provisional Application No. 63/225,160, filed on Jul. 23, 2021, which are incorporated herein by reference.

FIELD OF THE INVENTION

Embodiments of the present invention relate to degradable polymer structures made from carbon dioxide and an olefin. Particular embodiments of the invention relate to the polymerization of δ-valerolactone 2-ethylidene-6-hepten-5-olide (EVL) using an organocatalyst through ring opening polymerization.

BACKGROUND OF THE INVENTION

The majority of thermoplastics are produced from olefin feedstocks including ethylene, propylene, styrene, vinyl chloride, and 1,3-butadiene. Polymerization of these monomers generates macromolecules containing thermodynamically favorable carbon-carbon backbones which resist hydrolysis and environmental degradation.

The catalytic incorporation of carbon dioxide ($CO_2$) into these chains theoretically could afford a hydrolytically degradable polyester, but synthetically this has been found to render the alternating copolymerization reaction both thermodynamically and entropically unfavorable in practice. Therefore, most syntheses of $CO_2$-based polymers rely on high-energy comonomers such as oxiranes, aziridines, or alkynes.

$CO_2$ and butadiene have been coupled with a phosphine-ligated palladium catalyst, which produced the unsaturated disubstituted delta (δ)-valerolactone 2-ethylidene-6-hepten-5-olide (EVL). Subsequent efforts for synthesis of EVL have been demonstrated in a continuous reactor. Homopolymerization of EVL has also been described which yielded a poly(acrylate) structure with high glass transition temperatures ($T_g$s) up to 192° C. Post polymerization modification of the poly(acrylate) structure/polylactone resulted in reversible hydrolysis and aminolysis. In addition to this radical homopolymerization, the copolymerizations of EVL with dithiols, ethylene, or methacroyl moieties have also been described to produce polysulfide, polyolefin, and polyacrylate repeating units, respectively.

Although extensive advances in ring-opening polymerization (ROP) of lactones have been made, successful ring-opening homopolymerization of EVL has not been described. In fact, certain efforts that resulted in the lack of ROP reactivity for EVL and its hydrogenated derivatives have been reported. Though, the copolymerization of EVL with highly-strained β-butyrolactone to produce a polyester structure has been achieved. The polyester structure had up to 50 mol. % of EVL incorporation and number average molecular weights ($M_n$s) of 450 g/mol.

There remains a need in the art for degradable polymer structures made from carbon dioxide and an olefin.

SUMMARY OF THE INVENTION

An embodiment of the present invention provides a method of producing a degradable material, the method comprising steps of providing δ-valerolactone 2-ethylidene-6-hepten-5-olide (EVL); combining the EVL with a catalyst to form a reaction mixture; and subjecting the reaction mixture to conditions that will allow the EVL to react in the presence of the catalyst to thereby form a product composition including polymeric-EVL, wherein the polymeric-EVL is hydrolytically degradable.

Another embodiment of the present invention provides a method of producing a hydrolytically degradable material, the method comprising steps of providing δ-valerolactone 2-ethylidene-6-hepten-5-olide (EVL); combining the EVL with a catalyst to form a reaction mixture; and subjecting the reaction mixture to conditions that will allow the EVL to react in the presence of the catalyst to thereby form a product composition including dimeric-EVL.

A further embodiment of the present invention provides a method of producing a hydrolytically degradable material, the method comprising steps of providing carbon dioxide and an olefin in a first reaction mixture; subjecting the first reaction mixture to conditions that will allow the carbon dioxide to be chemically bonded with the olefin to form a monomer; combining the monomer with a catalyst to form a second reaction mixture; and subjecting the second reaction mixture to conditions that will allow the monomer to react in the presence of the organocatalyst to thereby form a product composition including a polymer of the monomer, wherein the polymer is hydrolytically degradable.

A further embodiment of the present invention provides a composition comprising polymeric δ-valerolactone 2-ethylidene-6-hepten-5-olide (EVL) defined by the following structure where x is an integer from 0 to 15; n is an integer from 0 to 15; and R is selected from a protic alcohol, an amine, and a guanidine; and dimeric δ-valerolactone 2-ethylidene-6-hepten-5-olide (EVL) defined by the following structure Another embodiment of the present invention provides a hydrolytically degradable material comprising a polymer of δ-valerolactone 2-ethylidene-6-hepten-5-olide (EVL) and a dimer of δ-valerolactone 2-ethylidene-6-hepten-5-olide (EVL).

DETAILED DESCRIPTION OF ILLUSTRATIVE EMBODIMENTS

Advantages of the present invention will become better understood with regard to the following description, appended claims, and accompanying drawings wherein:

DETAILED DESCRIPTION OF ILLUSTRATIVE EMBODIMENTS

Figure 1:
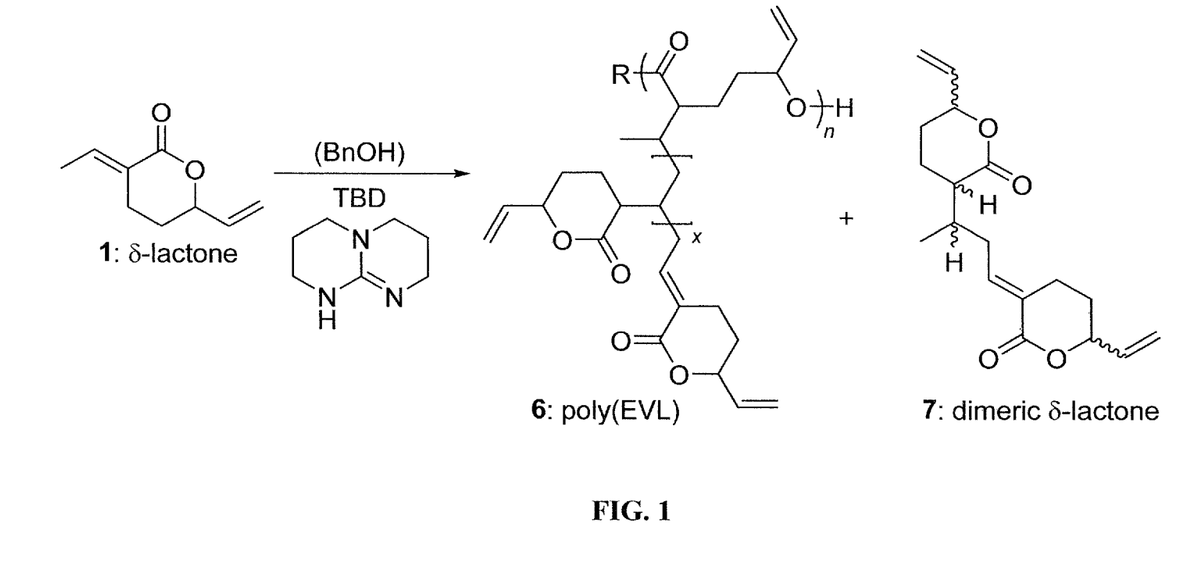
FIG. 1 is a schematic of δ-valerolactone 2-ethylidene-6-hepten-5-olide (EVL) undergoing a 1,5,7-triazabicyclo[4.4.0]dec-5-ene (TBD)-catalyzed reaction of vinylogous 1,4-conjugate addition to form dimer 7 (di-EVL) and polymerization to form polymeric macromolecules 6 (poly-EVL), according to one or more embodiments of the invention.

One or more embodiments of the present invention relate to degradable polymer structures made from carbon dioxide and an olefin. One or more embodiments of the invention relate to the polymerization of δ-valerolactone 2-ethylidene-6-hepten-5-olide (EVL), or other suitable monomer, using an organocatalyst through ring opening polymerization. As shown in FIG. 1, the δ-valerolactone 2-ethylidene-6-hepten-5-olide (EVL), which is labeled with the numeral 1, undergoes a catalyzed reaction of vinylogous 1,4-conjugate addition to form a dimer (di-EVL), which is labeled with the numeral 7, and polymerization to form polymeric macromolecules (poly-EVL), which is labeled with the numeral 6.

The dimer 7 is believed to be a mixture of eight diastereomers. As will be discussed further, a variety of specific macromolecules 6 may be formed based on the general overall structure shown in FIG. 1. The catalyst may be an organocatalyst, which may be 1,5,7-triazabicyclo[4.4.0]dec-5-ene (TBD). Advantageously, the present technique for transforming the EVL or other suitable monomer leads to materials that are generally hydrolytically degradable. The vinylogous 1,4-conjugate addition of the EVL results in certain novel chemical structure or structures and the ring-opening polymerization of the EVL also results in certain novel chemical structure or structures. Embodiments of the present invention also related to the combination of these structures as a useful material.

As suggested above, one or more embodiments of the present invention include a method with a first step of providing the EVL. This may include simply obtaining the EVL. In other embodiments, a method can include making the EVL. Where the EVL is made as part of a method, this generally includes the catalytic conversion of carbon dioxide ($CO_2$) with an olefin (e.g. 1,3-butadiene (BD)).

Any suitable olefin may be utilized for reaction with the $CO_2$. The olefin may be acyclic or cyclic. Exemplary acyclic olefins, which may also be referred to as linear olefins, include 1,3-butadiene and isoprene. Exemplary cyclic olefins include cyclohexadiene, norbornadiene, and α-phellandrene. The olefin may be obtained from a renewable source or a petroleum source.

The carbon dioxide is chemically bonded, which may also be referred to as chemically incorporated, with the olefin. The carbon dioxide is therefore chemically bonded within the EVL. This enables the sequestering of the carbon dioxide, a known greenhouse gas, within the EVL. Moreover, the end product after the transformation of the EVL allows for a valuable product that includes the carbon dioxide.

The reaction between the olefin and $CO_2$ may be catalyzed, such as with palladium (e.g. $Pd_2(dba)_3$). An additional ligand, such as a phosphine (e.g. tris(p-methoxyphenyl)phosphine), and/or a reducing agent (e.g. p-hydroquinone) may also be utilized. A solvent for the reaction may be acetonitrile (MeCN) or a carbonate based solvent, such as propylene carbonate, ethylene carbonate, or acyclic carbonates. An exemplary temperature for the reaction may be about 70° C. Other details as to the reaction between the olefin and $CO_2$ may generally be known to the skilled person.

After the EVL is obtained, the EVL serves as a monomer for a further reaction. As will be further discussed below, the EVL should be of a relatively high purity, which may include a purification step.

The δ-valerolactone 2-ethylidene-6-hepten-5-olide (EVL) is a lactone. Lactones can be generally described as cyclic carboxylic esters, containing a 1-oxacycloalkan-2-one structure (—C(=O)—O—). Lactones may also include analogues having unsaturation or heteroatoms replacing one or more carbon atoms of the ring. EVL may be described as a disubstituted lactone, an unsaturated lactone, or a disubstituted unsaturated lactone.

Other suitable monomers in addition to EVL may also be utilized in the reaction technique disclosed herein. While certain description herein may be specifically relative to EVL, it should be appreciated that this description can also be extended to these additional suitable monomers. These additional suitable monomers may include those that share similar properties, such as being cyclic and including the unsaturation. The additional suitable monomers may be described as suitable cyclic dienes. The additional suitable monomers may include other lactones or cyclic carbonates. Specific additional monomers may include lactide, caprolactone, butyrolactones, and 6-member cyclic carbonates (e.g. trimethylenecarbonate).

As mentioned above, the EVL or other suitable monomer should be of relatively high purity. This relatively high purity may be obtained by a distillation step that distills the EVL or other suitable monomer.

Where a distillation step is utilized, and where EVL is the monomer, the distillation for obtaining the EVL in sufficiently pure form for polymerization may be achieved by vacuum distillation (e.g. at about 200 mtorr) at temperatures between 50° C. and 110° C. At higher temperatures, the material decomposes, and at lower temperatures, the material will not boil at this pressure. Lower pressures, such as about 100 mtorr or about 20 mtorr, will enable lower temperatures for the distillation step.

The EVL or other suitable monomer may be characterized by the purity thereof, which may be following a distillation step or other suitable purification step. In one or more embodiments, the EVL or other suitable monomer has a purity of at least 90%, in other embodiments, at least 95%, in other embodiments, at least 98%, in other embodiments, at least 99%, and in other embodiments, about 100%, relative to the overall monomer composition utilized for the subsequent reaction step. Purity can be determined by any suitable technique, such as $^1$H NMR spectroscopy, LC-MS, and GC-MS, as generally known to the skilled person.

The reaction of the EVL or other suitable monomer should be catalyzed with an appropriate catalyst. An exemplary catalyst is 1,5,7-triazabicyclo[4.4.0]dec-5-ene (TBD). Other suitable catalysts may include DBU (1,8-Diazabicyclo (5.4.0) undec-7-ene), thioureas, alkylated TBD, guanidine, alkylated guanidines, and phosphazenes.

The activity of the catalyst TBD is attributed to its bifunctionality. This bifunctionality enables the simultaneous activation of both the cyclic ester monomer and the alcohol group of the initiator or propagating species. Other bifunctional catalysts may therefore be suitable for use as the catalyst.

The TBD may be provided within a solvent. An exemplary solvent is diethyl ether ($Et_2O$). Other aprotic solvents may also be utilized.

The reaction of the EVL or other suitable monomer may be aided by utilization of an initiator. A suitable initiator may be an alcohol for alcohol-initiated ring-opening polymerization of the EVL or other suitable monomer. An exemplary alcohol initiator is benzyl alcohol (BnOH). Other suitable initiators may be generally known to the skilled person.

Where utilized, the alcohol initiator may be provided within a solvent. An exemplary solvent is diethyl ether. Other aprotic solvents may also be utilized.

In other embodiments, the reaction of the EVL or other suitable monomer may be carried out without an alcohol initiator. Even without the alcohol initiator, a polymeric material can be produced.

In one or more embodiments, the EVL or other suitable monomer may undergo a modification step before the subsequent reaction of the modified monomer. An exemplary modification step is hydrogenation. The modification step (e.g. hydrogenation) and/or the use of a certain monomer may be selected in order to produce desirable end materials with tunable thermal properties.

Where a hydrogenation step is utilized, this includes partial elimination or complete elimination of the unsaturation within the monomer by introducing hydrogen. This introduction of hydrogen is after the monomer has been produced, for example at the end of the EVL monomer synthesis.

Where EVL is utilized, hydrogenation of the 6-member lactone produces a mixture of diastereomers. Hydrogenation of other monomers is also believed to produce a mixture of diastereomers. In one or more embodiments, the hydrogenated monomer may be more reactive to ROP catalysts and may also result in the reduction or elimination of side reactions.

In one or more embodiments, the molar ratio of the monomer to the catalyst, or the molar ratio of the molar ratio of the monomer to the catalyst to the initiator where the initiator is utilized, may be adjusted in order to achieve a desirable molecular weight and desirable thermal properties.

In one or more embodiments, the molar ratio of the monomer to the catalyst may be in a range of from 10:1 to 2,000:1, in other embodiments, from 10:1 to 50:1, in other embodiments, from 50:1 to 100:1, in other embodiments, from 100:1 to 200:1, in other embodiments, from 200:1 to 700:1, in other embodiments, from 700:1 to 2,000:1. In one or more embodiments, the molar ratio of the monomer to the catalyst may be about 2,000:1, in other embodiments, about 700:1, in other embodiments, about 200:1, and in other embodiments, about 100:1.

In one or more embodiments, where the initiator is present, the molar ratio of the monomer to the initiator may be in a range of from 10:1 to 200:1, in other embodiments, from 10:1 to 100:1, in other embodiments, from 20:1 to 40:1, and in other embodiments, 40:1 to 100:1. In one or more embodiments, where the initiator is present, the molar ratio of the monomer to the initiator may be about 20:1, in other embodiments, about 40:1, in other embodiments, about 60:1, and in other embodiments, about 100:1.

In one or more embodiments, where the initiator is present, the molar ratio of the catalyst to the initiator may be in a range of from 1:1 to 20:1, in other embodiments, from 1:1 to 10:1, in other embodiments, from 1:1 to 5:1, and in other embodiments, 2:1 to 4:1. In one or more embodiments, where the initiator is present, the molar ratio of the catalyst to the initiator may be about 10:1, in other embodiments, about 5:1, in other embodiments, about 4:1, and in other embodiments, about 2:1.

Where the initiator is utilized, the above described ratios may be utilized to describe the molar ratios for the monomer, catalyst, and initiator in combination. For example, in the above description, the molar ratio of the monomer to the catalyst may be about 200:1 and the ratio of the catalyst to the initiator, where present, may be about 5:1, so for one or more embodiments the molar ratio of monomer to the catalyst to the initiator may be about 200:5:1. Again, the molar ratios for other embodiments can be determined from the above described ratios.

In one or more embodiments, the reaction of the EVL or other suitable monomer may proceed under bulk polymerization conditions. That is, the reaction of the EVL or other suitable monomer may be generally solvent-free. As generally known to the skilled person, bulk polymerization conditions include reacting the monomer in liquid state, optionally in the presence of an initiator, where the reaction is initiated by sufficient or exposure to radiation.

In one or more embodiments, the reaction of the EVL or other suitable monomer may be devoid of solvent. In one or more embodiments, the reaction of the EVL or other suitable monomer may be with less than 2 wt. % solvent, in other embodiments, less than 1 wt. % solvent, in other embodiments, less than 0.5 wt. % solvent, and in other embodiments, less than 0.1 wt. % solvent, relative to the overall reaction mixture.

In one or more embodiments, the reaction of the EVL or other suitable monomer may be characterized by a particular temperature for the reaction. In one or more embodiments, the reaction of the EVL or other suitable monomer may be at a temperature of from −40° C. to 70° C., in other embodiments, from −30° C. to 60° C., in other embodiments, from −20° C. to 50° C., in other embodiments, from −10° C. to 40° C., and in other embodiments, from 10° C. to 30° C. In one or more embodiments, the reaction of the EVL or other suitable monomer may be at a temperature of about −20° C., in other embodiments, about 0° C., in other embodiments, about 25° C., and in other embodiments, about 50° C.

As suggested above, the reaction of the EVL or other suitable monomer produces a product that includes degradable macromolecules that arise from a combined vinylogous 1,4-conjugate addition and a ring-opening polymerization reaction. This resulting product may also be described as a polyester or a polyester lactone. This resulting product may further be described as a polyolefin or a polylactone. The resulting product might be tuned relative to the stereochemistry, microstructure, copolymers, block-architectures, thermal properties, and mechanical performance.

As mentioned above, the reaction product generally includes dimer of the EVL or other suitable monomer, and polymer of the EVL or other suitable monomer. The dimer may include diastereomers. The polymer can be a variety of structures. While the product can include both the dimer and the polymer, it can be described as a homopolymer since both the dimer and the polymer derive from the EVL or other suitable monomer. The presence of the dimer and polymer may be confirmed by any suitable technique, such as $^1$H, $^{13}$C, COSY, HSQC, and MS-spectroscopy. The variety of the polymer and the dimer within a final product may be referred to as the microstructure or polymer microstructure of the final product. The microstructure of a final product may be characterized by any suitable technique, including $^1$H, $^{13}$C, FTIR, MALDI-TOF MS, and ESI tandem MS-MS.

With reference to FIG. 1, where EVL is the monomer, which is labeled with the numeral 1, the EVL 1 forms a poly-EVL 6 and a di-EVL 7. As will be further described herein, it should be appreciated that the exact chemical structure of poly-EVL 6 may have some variety in terms of which lactone reacts and where the final double bond is located. Moreover, a final product may have more than one type of specific poly-EVL 6. As mentioned above, the dimer 7 is believed to be a mixture of eight diastereomers.

With further reference to FIG. 1, the poly-EVL 6 may include n units, which may be referred to as ring-opening polyester units, and x units, which may be referred to as 1,4-conjugate addition polyolefin units.

In one or more embodiments, n may be any integer from 0 to 15. That is, in one or more embodiments, n may be 0, in other embodiments, n may be 1, in other embodiments, n may be 2, and onward up to any integer up to 15. In one or more embodiments, n may be an integer in a range of from 0 to 15, in other embodiments, from 0 to 5, in other embodiments, from 0 to 7, in other embodiments, from 0 to 2, in other embodiments, from 1 to 3, and in other embodiments, from 2 to 5.

In one or more embodiments, x may be any integer from 0 to 15. That is, in one or more embodiments, x may be 0, in other embodiments, x may be 1, in other embodiments, x may be 2, and onward up to any integer up to 15. In one or more embodiments, x may be an integer in a range of from 0 to 15, in other embodiments, from 0 to 5, in other embodiments, from 0 to 7, in other embodiments, from 0 to 2, in other embodiments, from 1 to 3, and in other embodiments, from 2 to 5.

R can be selected from a protic alcohol (e.g. BnO), an amine, and a guanidine (e.g. 1,5,7-Triazabicyclo[4.4.0]dec-5-ene (TBD)).

The n, x, and R may be confirmed by any suitable technique, such as mass spectrometry or MALDI-MS. Again, the final product may have a variety of these specific polymers.

Figure 2:
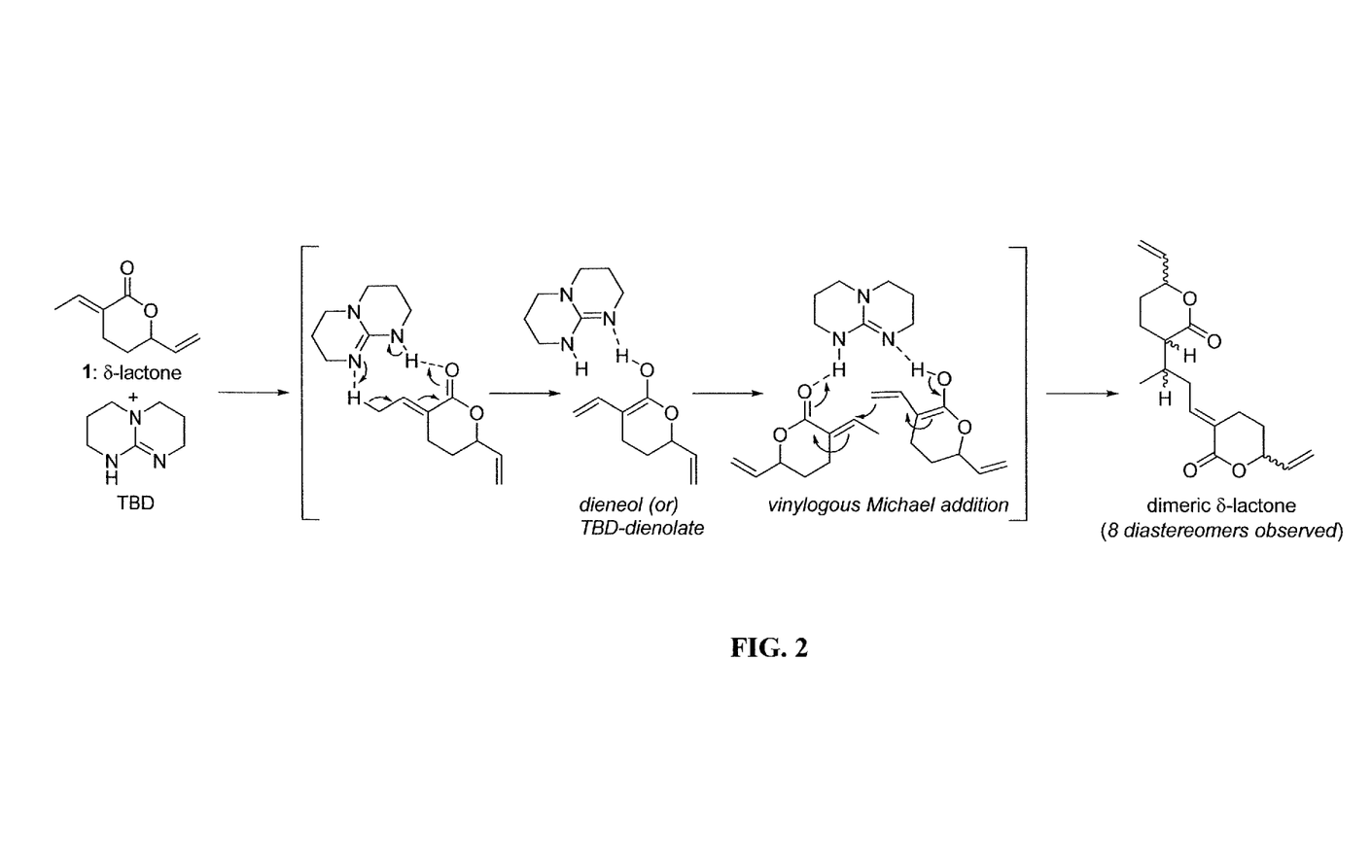
FIG. 2 is a schematic of a proposed mechanism of the vinylogous 1,4-conjugate addition dimerization, according to one or more embodiments of the invention.

With reference to FIG. 2, as mentioned above, the EVL 1 forms di-EVL 7. Without being bound by any theory, FIG. 2 sets forth a proposed mechanism for this vinylogous Michael addition.

Figure 4:
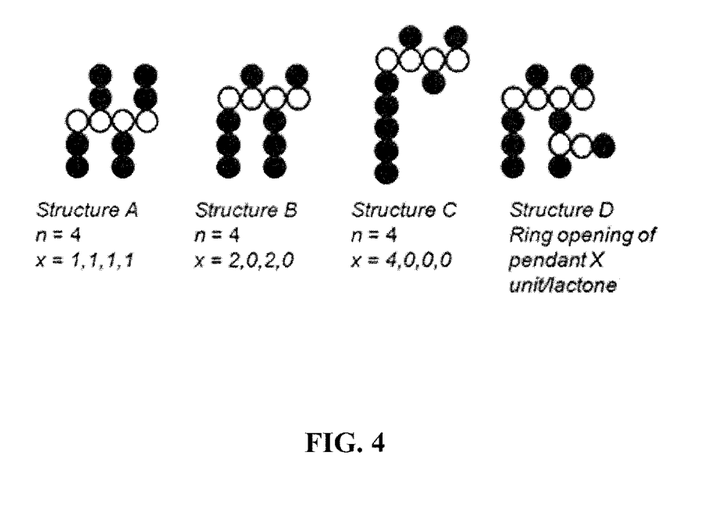
FIG. 4 is a schematic of various chemical structures that may form from the reaction of EVL, according to one or more embodiments of the invention.

With reference to FIG. 4, as mentioned above, the resulting polymer can be a variety of structures within the overall structure shown with the numeral 6 in FIG. 1. FIG. 4 shows a variety of possible specific structures where the white units are the "n" units, and the black units are the "x" units, of n and x from FIG. 1. The specific values of n and x units for these examples are listed in FIG. 4. With reference to Structure D of FIG. 4, it may be possible that one or more additional chains of n units builds off of a chain of the x units. This possibility can make for additional complexity in attempting to develop a specific polymer as a product. Nevertheless it should again be appreciated that the polymer of a final product may be a mixture of a variety of these structures, or may be only one of them.

Figure 5:
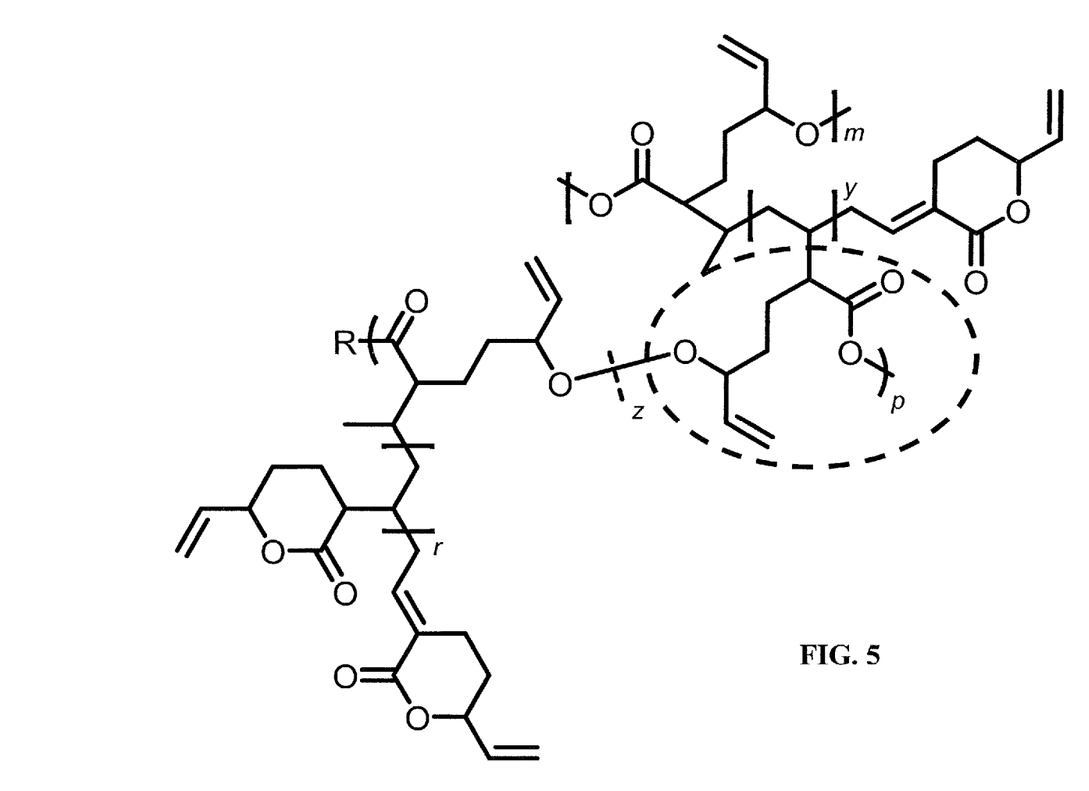
FIG. 5 is a schematic of a chemical structure that may form from the reaction of EVL, where the ring-opening of a pendant unit occurs to form a network structure, according to one or more embodiments of the invention.

With reference to FIG. 5, the ring-opening of a pendant unit may subsequently form a network structure. In FIG. 5, the ring-opened pendant unit is shown with the dashed circle. FIG. 5 is an attempt to show a different specific polymeric structure that might occur. In FIG. 5, R and z are units consistent with the structure from FIG. 1. In FIG. 5, ring-opening of pendant lactones results in the addition of an r unit to a polyester z unit. The resulting product is a p unit. The units of m and y generally correspond with the r and z units associated with that chain that was ring-opened. Said another way, the ring-opening polymerization units are m and z, the conjugate addition units are r and y, and the combination ring-opening/conjugate addition units are p.

In one or more embodiments, r may be any integer from 0 to 15. That is, in one or more embodiments, r may be 0, in other embodiments, r may be 1, in other embodiments, r may be 2, and onward up to any integer up to 15. In one or more embodiments, r may be an integer in a range of from 0 to 15, in other embodiments, from 0 to 5, in other embodiments, from 0 to 7, in other embodiments, from 0 to 2, in other embodiments, from 1 to 3, and in other embodiments, from 2 to 5.

In one or more embodiments, z may be any integer from 0 to 15. That is, in one or more embodiments, z may be 0, in other embodiments, z may be 1, in other embodiments, z may be 2, and onward up to any integer up to 15. In one or more embodiments, z may be an integer in a range of from 0 to 15, in other embodiments, from 0 to 5, in other embodiments, from 0 to 7, in other embodiments, from 0 to 2, in other embodiments, from 1 to 3, and in other embodiments, from 2 to 5.

In one or more embodiments, m may be any integer from 0 to 15. That is, in one or more embodiments, m may be 0, in other embodiments, m may be 1, in other embodiments, m may be 2, and onward up to any integer up to 15. In one or more embodiments, m may be an integer in a range of from 0 to 15, in other embodiments, from 0 to 5, in other embodiments, from 0 to 7, in other embodiments, from 0 to 2, in other embodiments, from 1 to 3, and in other embodiments, from 2 to 5.

In one or more embodiments, z may be any integer from 0 to 15. That is, in one or more embodiments, z may be 0, in other embodiments, z may be 1, in other embodiments, z may be 2, and onward up to any integer up to 15. In one or more embodiments, z may be an integer in a range of from 0 to 15, in other embodiments, from 0 to 5, in other embodiments, from 0 to 7, in other embodiments, from 0 to 2, in other embodiments, from 1 to 3, and in other embodiments, from 2 to 5.

In one or more embodiments, p may be any integer from 0 to 15. That is, in one or more embodiments, p may be 0, in other embodiments, p may be 1, in other embodiments, p may be 2, and onward up to any integer up to 15. In one or more embodiments, p may be an integer in a range of from 0 to 15, in other embodiments, from 0 to 5, in other embodiments, from 0 to 7, in other embodiments, from 0 to 2, in other embodiments, from 1 to 3, and in other embodiments, from 2 to 5.

After a product that includes the polymer (e.g. poly-EVL 6) and the dimer (e.g. di-EVL 7) is collected, the product may undergo a separation step in order to separate or purify the various products. However, any such separation step does not mean the polymer or the dimer are not useful. Both are believed to be useful products. Where utilized, a separation step is intended to form a pure or mostly pure polymer product and a pure or mostly pure dimer product.

In one or more embodiments, a separation step may include a precipitation step. For example, the polymer 6 may be precipitated in diethyl ether ($Et_2O$) in order to remove the dimer 7.

Where a separation step is utilized, the final products may be a pure or mostly pure polymer product and a pure or mostly pure dimer product. Some residual monomer may occur. In one or more embodiments, a purified polymer product may include at least 90% polymer, in other embodiments, at least 95% polymer, in other embodiments, at least 98% polymer, in other embodiments, at least 99% polymer, and in other embodiments, about 100% polymer, relative to the overall purified and collected polymer product. In one or more embodiments, a purified dimer product may include at least 90% dimer, in other embodiments, at least 95% dimer, in other embodiments, at least 98% dimer, in other embodiments, at least 99% dimer, and in other embodiments, about 100% dimer, relative to the overall purified and collected dimer product. The collected dimer may be subjected to radical polymerization to obtain new polymer structures that are believed to have relatively high thermal properties. Purity can be determined by any suitable technique, such as $^1H$ NMR spectroscopy, LC-MS, and GC-MS, as generally known to the skilled person.

As mentioned above, the carbon dioxide is chemically bonded with the olefin within the polyolefin structures of the final product. The polyolefin structures of the final product may contain up to about 29 wt. % carbon dioxide. In one or more embodiments, an initiator and comonomers may decrease the amount of carbon dioxide in the final product. In one or more embodiments, the final product may include up to about 28 wt. % carbon dioxide, in other embodiments, up to about 27 wt. % carbon dioxide, in other embodiments, up to about 25 wt. % carbon dioxide, in other embodiments, up to about 23 wt. % carbon dioxide, and in other embodiments, up to about 20 wt. % carbon dioxide.

As discussed above, the reaction product of one or more embodiments of the present invention is a degradable product. This degradation may also be referred to as being hydrolytically degradable or depolymerizable. Said another way, the product may be receptive of hydrolysis under certain conditions. The hydrolysis conditions may be without assistance from an enzyme. The hydrolysis conditions may be atmospheric conditions. In one or more embodiments, the hydrolysis conditions may be at a temperature of about 80° C. and include the use of about 1 M NaOH.

In one or more embodiments, the reaction product may be characterized by molecular weight, which may be either number average molar mass ($M_n$) or mass average molar mass ($M_w$). The molecular weight may be determined by any suitable technique, such as gel permeation chromatography (GPC).

In one or more embodiments, the reaction product may have a number average molar mass ($M_n$) of from 2,000 g/mol to 50,000 g/mol, in other embodiments, from 5,000 g/mol to 40,000 g/mol, in other embodiments, from 10,000 g/mol to 30,000 g/mol, and in other embodiments, from 2,000 g/mol to 5,000 g/mol. In one or more embodiments, the reaction product may have a number average molar mass ($M_n$) of about 2,000 g/mol, in other embodiments, about 5,000 g/mol, in other embodiments, about 10,000 g/mol, and in other embodiments, about 20,000 g/mol.

In one or more embodiments, the reaction product may have a mass average molar mass ($M_w$) of from 5,000 g/mol to 100,000 g/mol, in other embodiments, from 50,000 g/mol to 100,000 g/mol, in other embodiments, from 25,000 g/mol to 75,000 g/mol, and in other embodiments, from 25,000 g/mol to 50,000 g/mol. In one or more embodiments, the reaction product may have a mass average molar mass ($M_w$) of about 8,000 g/mol, in other embodiments, about 15,000 g/mol, in other embodiments, about 25,000 g/mol, in other embodiments, about 50,000 g/mol, in other embodiments, about 75,000 g/mol, and in other embodiments, about 100,000 g/mol.

In one or more embodiments, the reaction product may have a dispersity (Đ) ($M_w/M_n$) of from 1.5 to 2.5, in other embodiments, from 1.5 to 2.0, in other embodiments, from 2.0 to 2.5, and in other embodiments, 1.8 to 2.2. In one or more embodiments, the reaction product may have a dispersity (Đ) of about 1.5, in other embodiments, about 1.8, in other embodiments, about 2.0, in other embodiments, about 2.2, and in other embodiments, about 2.5.

The $M_w$, $M_n$, and Đ may be determined with any suitable technique, which may be gel-permeation chromatography (GPC) in THF relative to polystyrene standards.

In one or more embodiments, the reaction product may have a glass transition temperature ($T_g$) of from −20° C. to 0° C., in other embodiments, from −10° C. to 10° C., in other embodiments, from 25° C. to 50° C., and in other embodiments, from 50° C. to 75° C. In one or more embodiments, the reaction product may have a glass transition temperature ($T_g$) of about −10° C., in other embodiments, about 0° C., in other embodiments, about 40° C., in other embodiments, about 50° C., and in other embodiments, about 75° C.

The $T_g$ may be determined with any suitable technique, which may be differential scanning calorimetry (DSC) using midpoint half height analysis values of the second heating cycle from −50° C. to 150° C.

In one or more embodiments, the reaction of the EVL or other suitable monomer may proceed to a relatively high yield of the polymer. In one or more embodiments, the reaction of the EVL or other suitable monomer has a yield of the polymer of at least 40%, in other embodiments, at least 50%, in other embodiments, at least 60%, in other embodiments, at least 70%, in other embodiments, at least 80%, and in other embodiments, at least 90%. In one or more embodiments, the reaction of the EVL or other suitable monomer may result in a yield of polymer of about 50%, in other embodiments, about 60%, in other embodiments, about 70%, in other embodiments, about 80%, and in other embodiments, about 90%.

In other embodiments, it may be desirable to cause the reaction of the EVL or other suitable monomer to achieve a relatively high yield of the dimer. In one or more embodiments, the reaction of the EVL or other suitable monomer has a yield of the dimer of at least 40%, in other embodiments, at least 50%, in other embodiments, at least 60%, in other embodiments, at least 70%, in other embodiments, at least 80%, and in other embodiments, at least 90%. In one or more embodiments, the reaction of the EVL or other suitable monomer may result in a yield of dimer of about 50%, in other embodiments, about 60%, in other embodiments, about 70%, in other embodiments, about 80%, and in other embodiments, about 90%.

As generally described below relative to Table 1, the yields may be adjusted based on catalyst amount, initiator amount, and the respective molar ratios.

Based on the description herein, it should be appreciated that the present disclosure expands the molecular structures that can be accessed through the catalytic activation of $CO_2$ and olefins.

EXAMPLES

Examples Background

Polymerizations were carried out under dry nitrogen using an MBraun Unilab glovebox. High-pressure reactions were carried out in a 300 mL stainless steel Parr reactor with a pressure release valve. $^1$H NMR spectra were recorded using a Varian Inova 500 spectrometer and were referenced versus residual non-deuterated solvent shifts ($CHCl_3 \delta$=7.26 ppm) ($^1$H). $^{13}$C NMR spectra of polymers were recorded on a Varian Inova (500 MHz) spectrometer and were referenced versus solvent shifts ($CDCl_3$ $\delta$=77.16 ppm) ($^{13}$C). 2-dimensional NMR spectra were recorded using Varian Inova 500 spectrometer and were referenced in a similar manner. Molecular weights ($M_n$ and $M_w$) and molecular weight distributions (Ð)=$M_w/M_n$) were determined by gel permeation chromatography (GPC). Analyses were performed using a Tgsoh EcoSEC HLC-8320 GPC RI Detector with two 17393 TSKgel columns (7.8 mm ID×30 cm, 13 µm) and one 17367-TSKgel Guard Column (7.5 mm ID×7.5 cm, 13 µm). Inhibitor-free HPLC grade THF was used as the eluent at a flow rate of 1 mL/min at 40° C. Data were measured relative to calibrated polystyrene standards (Ð<1.05). Infrared (IR) spectra were recorded on a Perkin Elmer Frontier spectrometer equipped with an attenuated total reflection (ATR) system. Polymer glass transition temperatures ($T_g$s) were measured by differential scanning calorimetry using DSC-TA Discovery DSC 250. Analyses were performed in aluminum pans under nitrogen and data were collected from the second heating run at a heating rate of 10° C./min from −50 to 150° C. and processed with TA TRIOS Software using midpoint half height analysis value. Thermal decomposition temperature ($T_d$) was measured at 95 wt. % remaining by thermal gravimetric analysis (TGA) using a TA Q500 instrument at a heating rate of 10° C./min in N2 atmosphere. Results were processed with TA TRIOS Software. Matrix-assisted laser desorption/ionization-mass spectrometry (MALDI-MS) experiments were performed on a Bruker Ultraflex III MALDI time-of-flight/time-of-flight (ToF/ToF) mass spectrometer equipped with a Nd:YAG laser emitting at 355 nm. Stock solutions of α-cyano-4-hydroxycinnamic acid matrix (99.0%, MilliporeSigma) and NaTFA cationization salt (98%, Aldrich Chemistry) were prepared in methanol at concentrations of 20 mg/mL and 10 mg/mL, respectively. These solutions were then mixed in a volume ratio of 10:1 before being spotted onto the target plate. Samples were dissolved in methanol at a concentration of 10 mg/mL and were spotted onto the target plate using the sandwich method. The instrument was calibrated using 2000 Da polymethyl methacrylate standard (Aldrich Chemistry) prior to sample analysis. The MALDI-MS data were analyzed using Bruker's flexAnalysis v3.3. software. Molecular weight and dispersity were obtained using Polymerix software.

Electrospray ionization mass spectrometry (ESI-MS) and ESI-MS2 experiments were carried out on a Waters Synapt HDMS quadrupole/time-of-flight (Q/ToF) mass spectrometer equipped with an ESI source. For ESI-MS and ESI-MS2, stock solutions of the samples were prepared in methanol at 10 mg/mL. These solutions were then diluted in methanol to 0.1 µg/mL before being introduced into the ESI source via direct infusion at a flow rate of 20 µL/min. For ESI-MS measurements the instrument was operated in positive ion mode with a capillary voltage of 3.0 kV, an extraction cone voltage of 2.8 V, sampling cone voltage of 35 V, desolvation gas flow rate of 500 L/h (N2), trap cell collision energy (CE) of 6.0 eV, transfer cell CE of 4.0 eV, trap gas flow of 1.5 mL/min (argon), source temperature of 120° C., and desolvation temperature of 250° C. ESI-MS2 experiments were carried out via collisionally activated dissociation (CAD) using argon as collision gas in the trap cell with a collision energy of 45 eV (the transfer cell CE was set at 6.0 eV). The instrument was calibrated using NaI standard (99.5%, MilliporeSigma) prior to sample analysis. ESI-MS and ESI-MS2 results were analyzed using Waters MassLynx v4.1 software.

Carbon dioxide (≥99.990 vol %) research grade was purchased from Airgas. 1,3-Butadiene (≥99%), tris-(dibenzylideneacetone) dipalladium (0) (97%), hydroquinone (99%) and benzyl alcohol (≥99%) were purchased from MilliporeSigma and used as received. 1,5,7-triazabicyclo [4.4.0]dec-5-ene (TBD) was purchased from MilliporeSigma was used as received and stored in a nitrogen environment. Tris-(4-methoxyphenyl) phosphine was purchased from TCI America and used as received. All other reagents were purchased from commercial sources and used as received unless otherwise noted.

EVL was synthesized and was further purified by vacuum distillation between 70-90° C. at 100-200 mTorr and stored over 4 Å mol. sieves in a nitrogen environment in the glovebox. EVL is a colorless liquid, but if purified only by column chromatography the material had a faint yellow color and would inconsistently polymerize. The EVL was therefore purified by vacuum distillation.

The EVL synthesis is further described. A 300-mL stainless steel Parr reactor with a magnetic stir bar was evacuated and purged with nitrogen three times. To this vessel was added $Pd_2$ (dba)$_3$ (0.06 g, 0.07 mmol), hydroquinone (0.31 g, 2.82 mmol) and tris-(4-methoxyphenyl) phosphine (0.22 g, 0.62 mmol). The vessel was sealed and tightened with a wrench. A nitrogen line was attached and anhydrous $CH_3CN$ (20 mL) was injected via the Parr reactors injection port. The system was then cooled to −78° C. with a $CO_2$ (s)/acetone bath for the addition of 1,3-butadiene. The addition of 1,3-butadiene was done by first evacuating and purging a separate oven-dried glass pressure vessel equipped with a Swagelok quick connect and pressure release valve with nitrogen three times. The empty vessel was evacuated with vacuum, sealed, pre-weighed, and cooled to −78° C. with a $CO_2$ (s)/acetone bath. 1,3-Butadiene feed was connected, introduced, and the desired mass of 1,3-butadiene (82 g, 1.5 mol) was condensed. Using a canula, the 1,3-butadiene was transferred under nitrogen pressure into the pre-cooled Parr reactor containing solvent and reagents. Once the transfer was complete, the canula was removed, Parr reactor sealed, and warmed to room temperature by the gentle heating with a heat gun. Once no frost was observed and the outer wall of the vessel was near room temperature, $CO_2$ (27 atm) was introduced at a constant pressure. It may be hazardous to condense $CO_2$, which can occur if the vessel is still cold; no $CO_2$ was introduced until the vessel was at room temperature. The reactor was then heated to 70° C. using a silicone oil bath and stirred for 24 hours at this temperature and pressure. Heating was discontinued, the reactor removed from the oil bath, and slowly vented of pressure carefully once at room temperature. The vessel was disassembled, liquid transferred to a round bottom flask, and volatiles removed by roto-evaporation. The crude yellow liquid was purified by column chromatography ($SiO_2$, hexanes:EtOAc=3:1) to afford a pale yellow EVL liquid that was pure by $^1H$ NMR spectroscopy. The product was further purified by vacuum distillation (70-90° C.; 100-200 mTorr) to afford EVL as a colorless liquid suitable for polymerization (28.57 g, 35% yield).

Polymerizations were conducted under an inert environment in a nitrogen filled glovebox. In a typical procedure, a solution of TBD (0.05M in $Et_2O$) was prepared and measured by volume into a flame-dried 20 mL scintillation vial with Teflon-coated stir bar. If used (entries 1-6), the appropriate amount of benzyl alcohol (0.1M in $Et_2O$) was added. The stock solutions were used for accuracy and the $Et_2O$ was evaporated from the reaction vial under a stream of nitrogen. To the vial containing TBD (and BnOH, if used) was added EVL (1.53 g, 10.0 mmol). The reaction was sealed with an air-tight Teflon lined cap and stirred for 48 h in the glovebox, at which time the viscosity of the mixture increased to an extent that magnetic stirring was inhibited, and the contents turned an orange-brown, almost red color. The viscous material was dissolved in $CH_2Cl_2$ (10 mL) and precipitated by dropwise addition of the solution into rapidly stirring $Et_2O$ (250 mL). The $Et_2O$ solution was decanted and set aside for recovery of EVL and isolation of Di-EVL. The remaining precipitate was dissolved in $CH_2Cl_2$ (10 mL) and reprecipitated a second time by dropwise addition of the solution into vigorously stirring $Et_2O$ (250 mL). Residual TBD could be removed by dissolving in $CH_2Cl_2$ (100 mL) and washed consecutively with aqueous solutions of saturated $NaHCO_3$ (100 mL) and saturated $NH_4Cl$ (100 mL). The organic layers were collected, dried over $MgSO_4$, filtered, and dried under vacuum to afford poly (EVL).

For entry 1, Table 1, the above $Et_2O$ solutions obtained by precipitation of poly (EVL) were concentrated under vacuum and afforded a mixture of EVL (1) and its dimer (7) (1.26 g). Silica gel column chromatography (EtOAc:Hex, 1:3-1:1) delivered recovered EVL and Di-EVL as a mixture of diastereomers.

Example 1

The effects of the molar ratios of monomer to catalyst to initiator on molecular weight and thermal properties were analyzed for 9 entries. The below Table 1 includes these results.

TABLE 1

Results of TBD-catalyzed polymerization of EVL

| Entry (#) | TBD (mmol) | BnOH (mmol) | [M]:[TBD]:[BnOH] (mol. equiv.) | Yield of polymer 6 (%) | Mn (GPC) (g/mol) | Mw (GPC) (g/mol) | Đ (Mw/Mn) | Tg (° C.) |
|---|---|---|---|---|---|---|---|---|
| 1 | 0.2 | 0.1 | 200:04:02 | 15 | 3,760 | 7,930 | 2.11 | 33 |
| 2 | 0.5 | 0.1 | 200:10:02 | 40 | 2,120 | 4,600 | 2.17 | 49 |
| 3 | 0.5 | 0.25 | 200:10:05 | 22 | 2,120 | 5,050 | 2.38 | 25 |
| 4 | 0.5 | 0.5 | 200:10:10 | 19 | 2,100 | 4,240 | 2.05 | 38 |
| 5 | 1 | 0.25 | 200:20:05 | 45 | 1,810 | 3,830 | 2.12 | 40 |
| 6 | 1 | 0.5 | 200:20:10 | 36 | 1,350 | 2,600 | 1.93 | 38 |
| 7 | 0.2 | — | 200:04:00 | 36 | 3,490 | 8,950 | 2.56 | 37 |
| 8 | 0.5 | — | 200:10:00 | 57 | 2,220 | 4,510 | 2.04 | 42 |
| 9 | 1 | — | 200:20:00 | 42 | 1,710 | 5,150 | 3.01 | 52 |

As shown in Table 1, increasing TBD:monomer ratio from 1:50 to 1:20 afforded higher yields of polymer (Entries 1, 2). Increasing BnOH:monomer ratio from 1:100 to 1:20 with a constant TBD:monomer loading of 1:20 resulted in negligible changes in the molecular weight (Entries 2-4, $M_n$=2,120 and 2,100 g/mol, respectively), but a significant decrease in yield. This observation is consistent with TBD-acyl intermediates as the active species in a non-controlled propagation mechanism, a moiety which is deactivated by BnOH addition. In the absence of BnOH, increasing TBD:monomer ratios from 1:50 to 1:10 (Entries 7-9) resulted in a decrease of $M_n$ from 3,490 g/mol to 1,710 g/mol.

The glass transition temperature ($T_g$) of poly (EVL) ranged from 25° C. to 52° C. and was not well-correlated with molecular weight. In some samples, the two variables were inversely related (Entries 7-9).

Example 2

Figure 3:
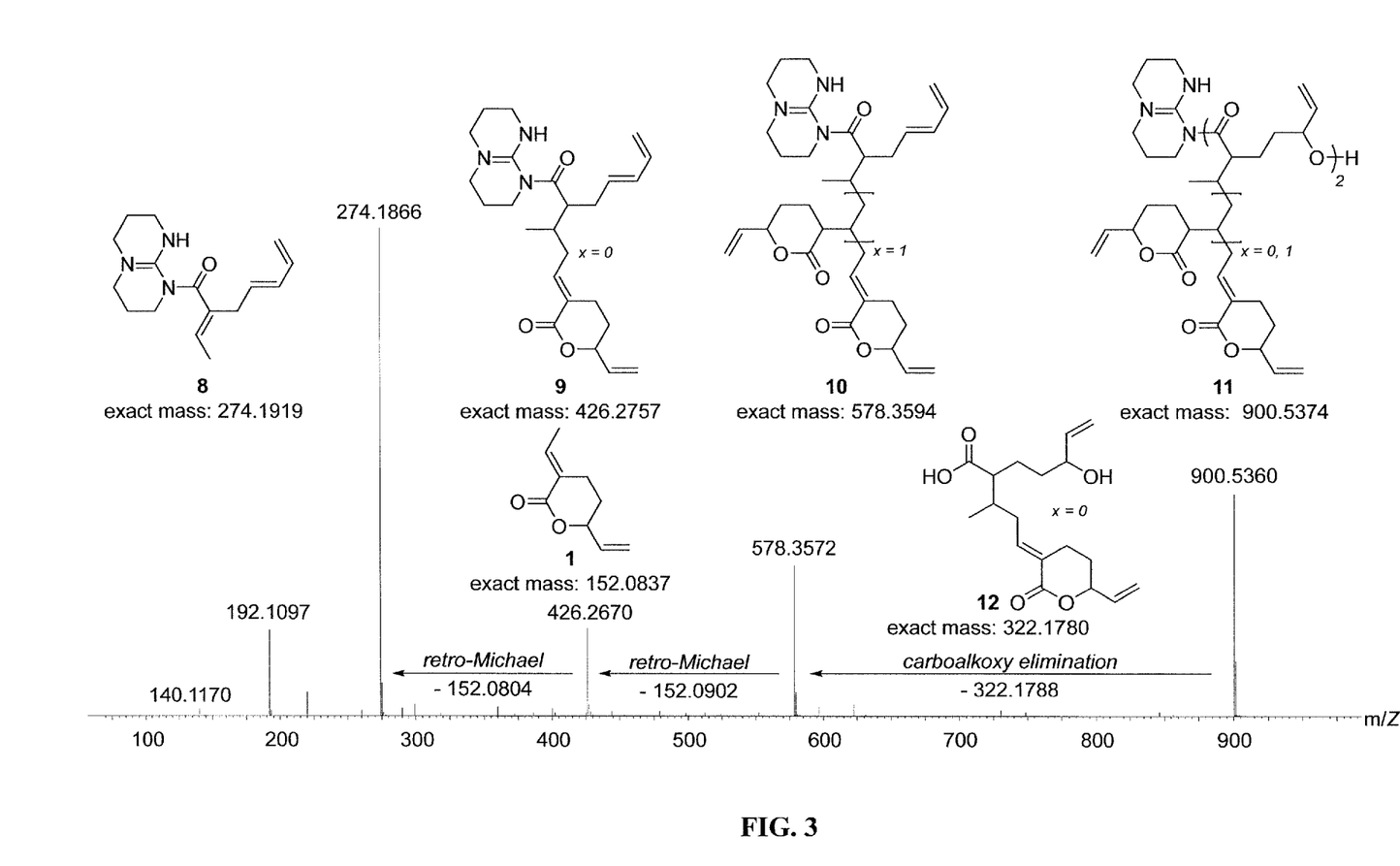
FIG. 3 is a schematic of tandem ESI MS/MS spectra of poly (EVL) and ion fragment 900.5360 m/Z, according to one or more embodiments of the invention.

With reference to FIG. 3, to better understand the microstructure of the polymers, tandem ESI MS/MS was performed on Entry 2 of the above Table 1 in which the ion fragment 900.5360 m/Z (numeral 11 in FIG. 3) was sequentially fragmented. The observed loss of 322 m/Z (numeral 12 in FIG. 3) is consistent with carboalkoxy elimination in the polyester backbone of the dimeric ROP repeat unit where x=0. Consecutive fragments of 152 m/Z were assigned to the loss of conjugate addition repeat units (x) via retro-Michael pathways.

Example 3

Figure 6:
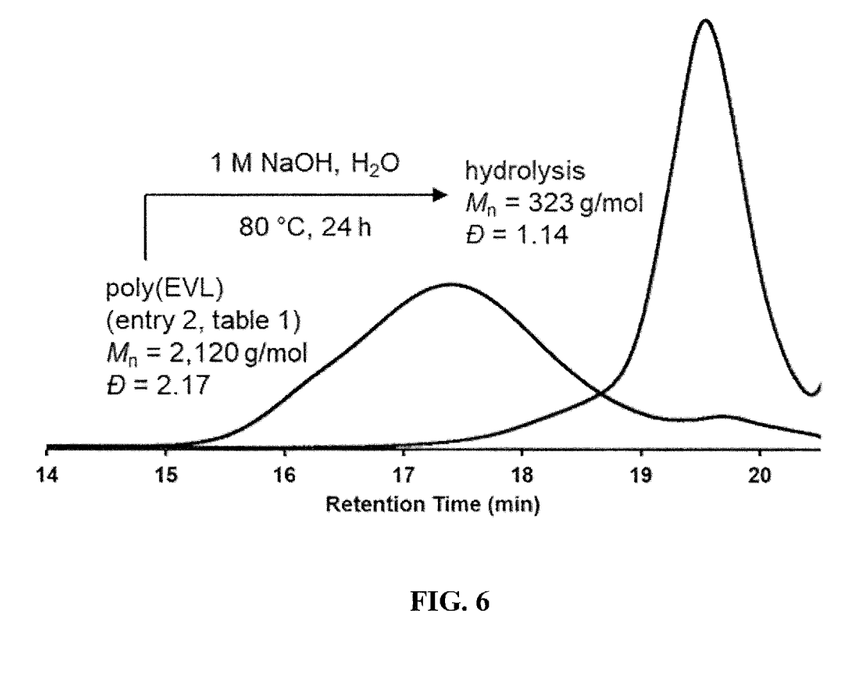
FIG. 6 is GPC analysis of molecular weights of poly (EVL) from Entry 2 of Table 1 disclosed elsewhere herein, compared with the same analysis of the crude hydrolytic degradation product under certain conditions.

Chemical degradation of the polymer product ($M_n$=2,120 g/mol, Entry 2, Table 1) was studied under hydrolytic conditions. A sample of poly (EVL) was heated in basic water (1 M NaOH, 80° C.) for 48 hours, acidified with 1 M HCl, and extracted with ethyl acetate (EtOAc). The resulting crude products were absent of polymeric species by GPC analysis (FIG. 6).

Examples-Theory

Without being bound by any theory, certain discussion of the theory for the herein disclosed reaction will now be provided. The $^1$H NMR revealed that the reaction between EVL monomer and TBD/BnOH produced a polymer microstructure inconsistent with the expected ROP product of poly (EVL) polyester. Specifically, the 2-position β-H of the unsaturated lactone moiety of monomeric EVL (H-resonance $2_m$, δ=7.16 ppm) was observed in a 1:3 ratio with the 7-position vinyl C—H of the vinyl lactone in the polymer (H-resonance $7_p$s, δ=5.87 ppm); a 1:1 ratio would be expected for the expected ROP product of poly (EVL) polyester. Additionally, both the $^1$H and $^{13}$C NMR spectra of the polymer were inconsistent with earlier produced radical homopolymers and copolymer.

Crude $^1$H NMR analysis of a reaction aliquot after 12 hours indicated the formation of an intermediate compound during the course of the reaction. This molecule was isolated, purified by silica-gel column chromatography, and identified as dimeric lactone 7: di-EVL through a combination of MS and NMR experiments ($^1$H, $^{13}$C, COSY, HSQC, Figures S5-S10). Diagnostic resonances in the aliphatic region (δ=0.99-1.07 ppm) appear during the course of the reaction indicating transformation of one of the acrylate moieties. The 1H integration of the 2- and 7-positions in the dimer (i.e., $2_d$: $7_d$+$7'_d$) are equal to 1:2 in the purified material, consistent with the di-EVL (7) assignment. Dimer 7 is generated as a mixture of 8 diastereomers, as evident in the $^{13}$C NMR which is due to the racemic starting material (±)-1 and lack of stereoselectivity in the dimerization. Exclusive formation of the (E)-alkene is observed in the unsaturated lactone moiety. The di-EVL is believed to be formed by a formal vinylogous 1,4-conjugate Michael addition of one TBD-activated dienolate of EVL to the α,β-unsaturated carbonyl of a second EVL molecule.

Having identified the vinylogous Michael reactivity of EVL with the bifunctional organocatalyst, the 1:3 ratio of β-H resonance:vinyl lactone moiety (i.e., 2-position: 7-position) observed in the polymer $^1$H NMR spectrum could be rationalized as concomitant ring-opening (n repeat units) and conjugate addition propagation (x repeat units) (numeral 6). Within the ROP units is a distribution of x integers and x can equal 0 (as in 7: di-EVL), but the average distribution throughout this material was $x_{avg}$=1, a conclusion reached based on the above 1H NMR integrations. All materials isolated behaved as soluble thermoplastics, an observation which indicated minimal cross-linking, if any.

Mass spectrometry (MS) studies were conducted on the isolated polymer including tandem MS/MS and MALDI-TOF MS. MALDI-TOF MS analysis of poly (EVL) (6) (entry 2, Table 1) corroborated the macromolecule formation ($M_n$=1,080 g/mol, Ð=1.17). The discrepancy between MALDI-TOF MS and GPC analysis was attributed to the larger radius of gyration for poly (EVL) (6) relative to the PS standards in GPC. Of note, the MALDI molar mass distribution was observed with TBD end-groups. Repeating the polymerization under identical conditions, but excluding BnOH (entry 8, Table 1) also produced polymeric material ($M_n$=2,220 g/mol, Ð=2.0 by GPC). Thus, the TBD is believed to be a catalyst for conjugate addition as well as both the initiator and mediator in the ring-opening propagation via an acyl ammonium intermediate similar to previous zwitterionic polymerization of lactones.

In light of the foregoing, it should be appreciated that the present invention significantly advances the art by providing improved degradable polymer structures and corresponding methods. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of producing a degradable material, the method comprising steps of
    hydrogenating δ-valerolactone 2-ethylidene-6-hepten-5-olide (EVL) by introducing hydrogen to the EVL, to thereby produce modified EVL;
    combining the modified EVL with a catalyst to form a reaction mixture; and
    subjecting the reaction mixture to reaction conditions that will allow the modified EVL to react by ring-opening polymerization in the presence of the catalyst to thereby form a product composition including polymeric-EVL, wherein the polymeric-EVL is hydrolytically degradable, wherein the reaction conditions include a reaction temperature of from −40° C. to 70° C.

2. The method of claim 1, wherein the catalyst is selected from 1,5,7-triazabicyclo[4.4.0]dec-5-ene (TBD), 1,8-Diazabicyclo(5.4.0) undec-7-ene (DBU), thioureas, alkylated TBD, guanidine, alkylated guanidines, and phosphazenes.

3. The method of claim 1, wherein the catalyst is 1,5,7-triazabicyclo[4.4.0]dec-5-ene (TBD).

4. A method of producing a hydrolytically degradable material, the method comprising steps of
    providing δ-valerolactone 2-ethylidene-6-hepten-5-olide (EVL);
    combining the EVL with a catalyst to form a reaction mixture;
    subjecting the reaction mixture to reaction conditions that will allow the EVL to react in the presence of the catalyst to thereby form a product composition including dimeric-EVL as an intermediate; and
    further subjecting the product composition including the dimeric-EVL as the intermediate to the reaction conditions to thereby react the dimeric-EVL by ring-opening polymerization to form a further product composition including polymeric-EVL, wherein the polymeric-EVL is hydrolytically degradable,
    wherein the reaction conditions include a reaction temperature of from −40° C. to 70° C.

5. The method of claim 4, wherein the further product composition includes both the polymeric-EVL and residual dimeric-EVL, the method further comprising a step of purifying the further product composition to form a first product including the residual dimeric-EVL and a second product including the polymeric-EVL.

6. The method of claim 1, wherein the EVL is at a purity of at least 95% prior to the step of hydrogenating.

7. The method of claim 6, further comprising a step of distilling a composition including the EVL in order to achieve the purity of at least 95%.

8. The method of claim 5, wherein the first product including the residual dimeric-EVL has a purity of at least 95% of the residual dimeric-EVL, and wherein the second product including the polymeric-EVL has a purity of at least 95% of the polymeric-EVL.

9. The method of claim 4, wherein the product composition including the dimeric-EVL includes at least 95 wt. % of the dimeric-EVL.

10. The method of claim 4, wherein the catalyst is selected from 1,5,7-triazabicyclo[4.4.0]dec-5-ene (TBD), 1,8-Diazabicyclo(5.4.0) undec-7-ene (DBU), thioureas, alkylated TBD, guanidine, alkylated guanidines, and phosphazenes.

* * * * *